United States Patent
Lin et al.

(10) Patent No.: US 8,505,098 B2
(45) Date of Patent: Aug. 6, 2013

(54) METHOD FOR RECORDING, RECOVERING, AND REPLAYING REAL TRAFFIC

(75) Inventors: Ying Dar Lin, Hsinchu (TW); Tsung Huan Cheng, Hsinchu (TW); Yuan Cheng Lai, Taipei (TW); I Wei Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 417 days.

(21) Appl. No.: 12/884,826

(22) Filed: Sep. 17, 2010

(65) Prior Publication Data
US 2012/0005754 A1 Jan. 5, 2012

(30) Foreign Application Priority Data
Jul. 2, 2010 (TW) ................................ 99121944 A

(51) Int. Cl.
*G06F 11/00* (2006.01)
(52) U.S. Cl.
USPC ............ 726/24; 709/224; 370/252; 370/253; 370/352; 370/392; 370/394; 713/190; 713/194
(58) Field of Classification Search
USPC ................. 726/1, 22–24; 709/224; 370/392, 370/394, 395.2, 383, 437, 410, 325, 252–253, 370/352; 713/190, 194
See application file for complete search history.

(56) References Cited

U.S. PATENT DOCUMENTS

| | | | |
|---|---|---|---|
| 7,376,969 B1* | 5/2008 | Njemanze et al. | 726/22 |
| 7,653,006 B1* | 1/2010 | Marino et al. | 370/252 |
| 8,274,906 B2* | 9/2012 | Jiang | 370/252 |
| 2001/0039579 A1* | 11/2001 | Trcka et al. | 709/224 |
| 2003/0145232 A1* | 7/2003 | Poletto et al. | 713/201 |
| 2004/0090923 A1* | 5/2004 | Kan et al. | 370/252 |
| 2005/0060295 A1* | 3/2005 | Gould et al. | 707/3 |
| 2005/0240656 A1* | 10/2005 | Blair | 709/213 |
| 2010/0142446 A1* | 6/2010 | Schlicht et al. | 370/328 |
| 2010/0242098 A1* | 9/2010 | Kenworthy | 726/4 |

OTHER PUBLICATIONS

Yi Qian, et. al., Information Assurance: Dependability and Security in Networked Systems; Nov. 2007.*

(Continued)

*Primary Examiner* — Luu Pham
*Assistant Examiner* — Angela Holmes
(74) *Attorney, Agent, or Firm* — Morris Manning & Martin LLP; Tim Tingkang Xia, Esq.

(57) ABSTRACT

A recording, recovering, and replaying method for real traffic is used for processing a plurality of network packets of a plurality of network connections. A recording procedure of the method includes the following steps. A recording parameter (N, M, P) is received. A header and a payload of each network packet of the network connections are completely recorded, and a payload accumulation value of each network connection is accumulated. When one of the payload accumulation values exceeds N, the header of each network packet and first M bytes of the payload are recorded for P consecutive network packets corresponding to the payload accumulation value. When one of the payload accumulation values exceeds N and after the P consecutive network packets of the network connection corresponding to the payload accumulation value are recorded, the header of each network packet is recorded for the network connection corresponding to the payload accumulation value.

18 Claims, 13 Drawing Sheets

OTHER PUBLICATIONS

Khan, N. Y., et. al., Comparative study of intrusion detection system and its Recovery mechanism; Computer and Automation Engineering (ICCAE), 2010 The 2nd International Conference on (978-1-4244-5585-0) 2010. vol. 5;p. 627-631;Source: IEEE Electronic Library Online.*

Mukkamala, S., et. al, Detecting Coordinated Distributed Multiple Attacks; Advanced Information Networking and Applications Workshops, 2007, AINAW '07. 21st International Conference on (978-0-7695-2847-2); 2007. vol. 1;p. 557-562.*

* cited by examiner

METHOD FOR RECORDING, RECOVERING, AND REPLAYING REAL TRAFFIC

CROSS-REFERENCE TO RELATED APPLICATIONS

This non-provisional application claims priority under 35 U.S.C. §119(a) on Patent Application No(s). 099121944 filed in Taiwan, R.O.C. on Jul. 2, 2010, the entire contents of which are hereby incorporated by reference.

BACKGROUND OF THE INVENTION

1. Field of the Invention

The present invention relates to a method for recording, recovering, and replaying real traffic, and more particularly to a method comprising a recording procedure, a recovery procedure, or a selective replay procedure.

2. Related Art

In the prior art, in a recording system, a traffic recording technology is implemented through a special dedicated hardware design in combination with various software packages, so as to reduce a loss situation as much as possible. The key points of the technology are usually topics on the amount of preprocessors, the operating system, and the size of a buffer area. In addition to a technology of improving performances of software and hardware systems, a technology similar to a time machine exists, thereby saving a storage space by analyzing network traffic behaviors. In the technology, a cutoff mechanism of 10000 to 20000 bytes is used to record each network connection. It is found that the large traffic usually comes from few connections, such that on the whole, the time machine technology may completely record most of the network connection with small traffic. A cutoff value thereof is dynamically adjusted by parsing of the traffic.

However, in the technologies, a traffic recording policy is not decided and the traffic recording method is not designed from a purpose of testing "trigger/reproduce a network event", such that currently the recording technologies and methods are not quite suitable for testing. Also, in the prior art, a large storage space is wasted to store valueless network traffic, such that a great amount of quick and real network traffic cannot be completely recorded. Further, as the great amount of quick and real network traffic cannot be handled, a record loss situation occurs.

For a technology for replaying network traffic, for example, for TCPreplay, the network traffic is replayed according to a timestamp; and for Tomahawk, a next packet is replayed after a previous packet is arrived. However, in the two technologies, the state of the network protocol is not maintained in the process that the network traffic is replayed, thus causing a problem of stateless replay.

Accordingly, several technologies capable of maintaining the state of the network protocol (referred to as stateful replay) are developed. For example, for TCPopera, when the network traffic is replayed, a rule of transmitting data according to the Transmission Control Protocol/Internet Protocol (TCP/IP) is achieved by using 4 heuristics. For Monkey, a socket is established to simulate the TCP/IP protocol and simulate network situations. For Avalanche, a trace file sample is accepted, the trace file is analyzed, and a great amount of network traffic when a plurality of users exists at the same time is simulated. In addition, in some further technologies, not only states of the network layer and the transmission layer, but also the state of the application layer can be maintained.

However, same as the traffic recording technology, in the current traffic replaying technologies, the design and the implementation are not performed from the purpose of testing "trigger/reproduce a network event", such that the current replaying technologies and methods are not quite suitable for testing. The conventional replaying technologies and tools cannot accurately replay the network connections satisfying the network protocol according to an incomplete network packet. Further, in the prior art, the event cannot be effectively reproduced, so it is difficult to know causes of network events.

SUMMARY OF THE INVENTION

It may be known from the analysis above that in the conventional method for processing the network packet, no matter in the method for recording or replaying real traffic (i.e. network traffic), a large storage space is wasted, a long replay time is wasted, network connections satisfying a network protocol cannot be played according to incomplete network packets, or a network event cannot be accurately reproduced.

In order to solve the problems, a method for recording, recovering, and replaying real traffic is provided, which is used for processing a plurality of network packets of a plurality of network connections in a network.

The method for recording, recovering, and replaying real traffic comprises a recording procedure, so as to record network packets of each network connection. The recording procedure comprises the following steps. A recording parameter (N, M, P) is received, in which N, M, and P are integers greater than or equal to zero. A header and a payload of each network packet of the network connections are completely recorded, and a payload accumulation value of each network connection is accumulated. When one of the payload accumulation values exceeds N, the header and first M bytes of the payload are recorded of P consecutive network packets of the network connection corresponding to the payload accumulation value. When one of the payload accumulation values exceeds N and after the P consecutive network packets of the network connection corresponding to the payload accumulation value are recorded, the header of each network packet is recorded for the network packets of the network connection corresponding to the payload accumulation value.

In an embodiment, the method for recording, recovering, and replaying the real traffic further comprises a recovery procedure, which comprises the following steps. It is checked whether the headers and the payloads of the network packets are complete or not one by one. When at least one incomplete network packet is obtained, it is determined whether the incomplete network packet has the complete header or not. When the incomplete network packet has the complete header, the following steps are executed. A payload length of the incomplete network packet is obtained according to the header of the incomplete network packet. A dummy value is written as the payload of the incomplete network packet according to the payload length.

The recovery procedure further comprises the following steps. When the incomplete network packet has the incomplete header, the following steps are executed. The header of the incomplete network packet is recovered according to other network packets of the network connection corresponding to the incomplete network packet. The payload length of the incomplete network packet is obtained according to the recovered header of the incomplete network packet. The dummy value is written as the payload of the incomplete network packet according to the payload length.

The recovery procedure further comprises the following steps. At least one loss packet being record-lost is found according to a sequence number and an acknowledgement number of the headers of the network packets of the network connections. The header of the loss packet is recovered according to other network packets of the network connection corresponding to the loss packet. The payload length of the loss packet is obtained according to the recovered header of the loss packet. The dummy value is written as the payload of the loss packet according to the payload length.

The dummy value may be a random number.

In an embodiment, the method for recording, recovering, and replaying the real traffic further comprises a replay procedure (or called as a selective replay procedure), which comprises the following steps. An event time and a network connection information are received, in which the network connection information comprises at least one network connection address. The network packets of the at least one network connection corresponding to the network connection address are replayed.

The selective replay procedure further comprises the following steps. A specific connection in the network connections is obtained according to the network connection address of the network connection information, a network connection protocol, and a network connection port. The network packets of the specific connection are replayed.

The selective replay procedure further comprises replaying the network packets of the at least one network connection being transmitted at the event time.

The selective replay procedure further comprises replaying the network packets of the at least one network connection ending transmission before the event time.

The network connection address is the IP address. The network connections satisfy the Transmission Control Protocol (TCP) or the User Datagram Protocol (UDP).

To sum up, in the method for recording, recovering, and replaying the real traffic, the problems such as that the storage space is wasted and the network event cannot be accurately reproduced may be solved. In the recording procedure, the relatively valuable real traffic is recorded, thereby saving most of the stage space. In the recovery procedure, the network packets being omitted or record-lost in the recording procedure are also recovered, thereby obtaining the complete network packet satisfying the network communication protocol. In the selective replay procedure, the network connection technology most relevant to the network event can be found, thereby accurately and quickly reproducing the network event.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described below in great detail through the following embodiments, and the content of the detailed description is sufficient for any person skilled in the art to understand the technical content of the present invention and to implement the present invention there accordingly. Based upon the content of the specification, the claims, and the drawings, any person skilled in the art can easily understand the relevant objectives and advantages of the present invention.

The present invention provides a method for recording, recovering, and replaying real traffic, which is used for processing a plurality of network packets of a plurality of network connections. The network connections satisfy the Transmission Control Protocol (TCP) or the User Datagram Protocol (UDP). The network packets refer to network packets of the Internet Protocol (IP) layer.

The method for recording, recovering, and replaying the real traffic comprises a recording procedure, so as to record the network packets of the network connection for each network connection. For each network connection, the recording procedure only records a part of relatively valuable packets in the network connection, thereby saving a large storage space.

The method for recording, recovering, and replaying the real traffic further comprises a recovery procedure or a replay procedure (or called as a selective replay procedure). The recovery procedure is used for recovering the network packets of the network connection for each network connection, and the selective replay procedure selectively replays a part of the packets from the recorded packets of the network connection, so as to reproduce a network event. The network event is such as an attack event, a virus event, a peer-to-peer (P2P) application or a connection interruption event.

Figure 1:
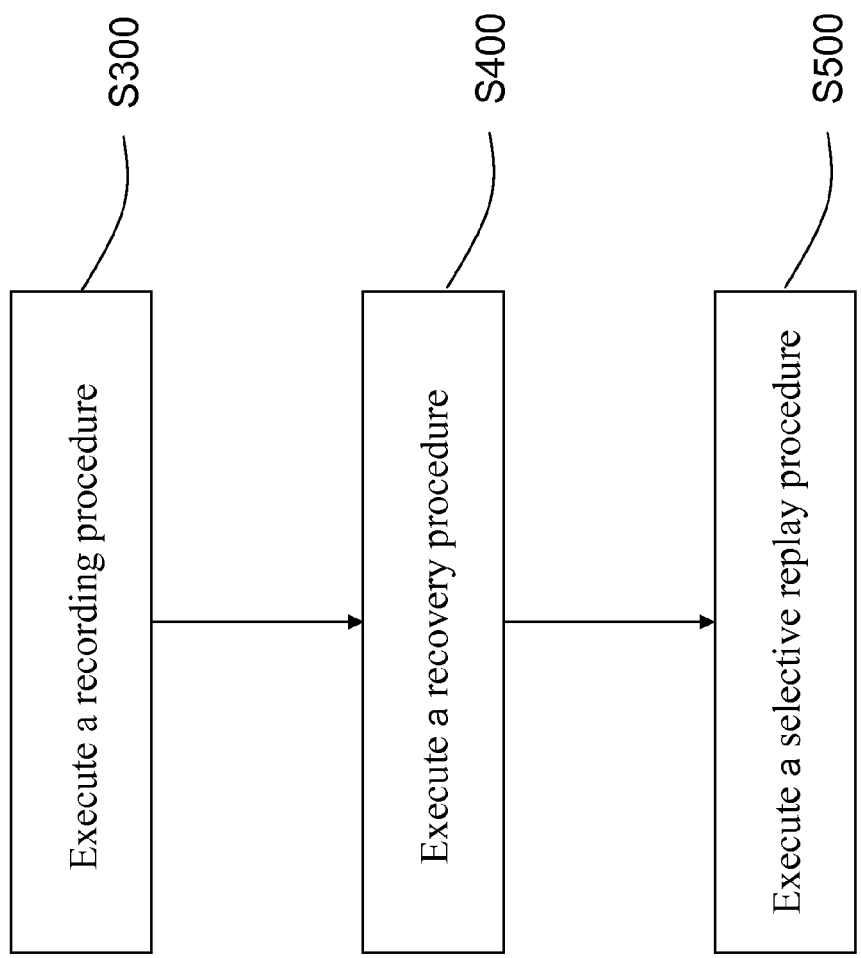
FIG. 1 is a flow chart of a method for recording, recovering, and replaying real traffic according to an embodiment.

FIG. 1 is a flow chart of a method for recording, recovering, and replaying real traffic according to an embodiment. As shown in FIG. 1, the method for recording, recovering, and replaying the real traffic is performed according to steps of executing the recording procedure (Step S300), executing the recovery procedure (Step S400), and executing the selective replay procedure (Step S500). However, the recording procedure, the recovery procedure, and the selective replay procedure may be individually and separately executed, and may be executed after being combined in any sequence. For example, the selective replay procedure may directly play completely recorded network traffic (i.e. real traffic) information; or the recovery procedure is executed while the recording procedure is executed, so as to obtain relatively complete network traffic information.

Figure 2:
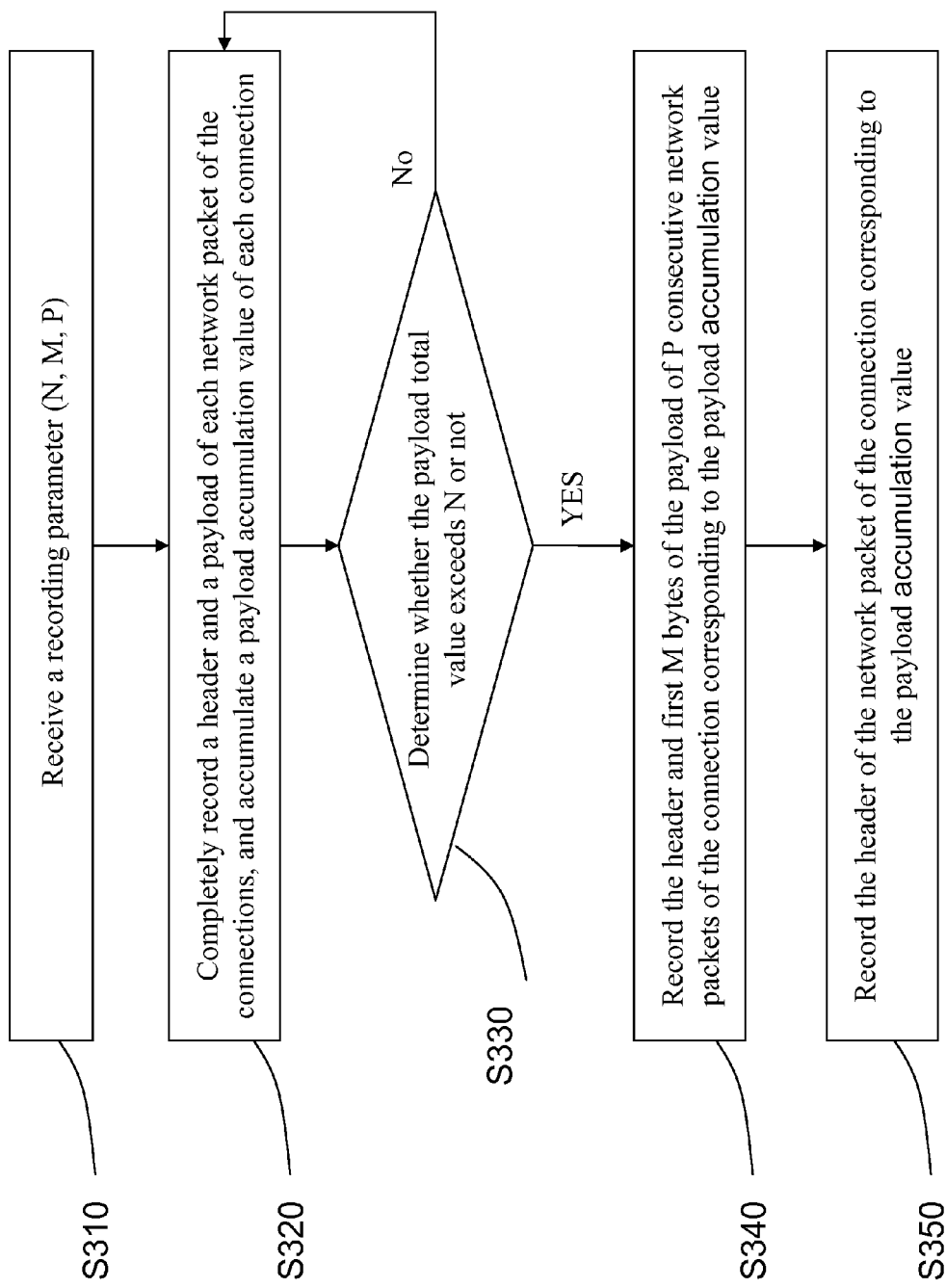
FIG. 2 is a flow chart of a recording procedure according to an embodiment.

Next, referring to FIG. 2, steps of the recording procedure are described. FIG. 2 is a flow chart of the recording procedure according to an embodiment.

First, a recording parameter (N, M, P) is received, in which N, M, and P are integers greater than or equal to zero (Step S310). In the recording procedure, the network packets of all network connections can be recorded by using the same recording parameter, and also a different recording parameter can be configured for each network connection to record the network packets. In the recording procedure, a header and a payload of each network packet of the network connections are completely recorded, and a payload accumulation value of each network connection is accumulated (Step S320). In other words, in Step S320, the headers and the payloads of the network packets are completely recorded. The payload accumulation value is a total value of the payloads of the currently recorded network packets, and the unit is byte.

When the network packet is recorded in the recording procedure, it is continuously determined whether the payload accumulation value exceeds N of the recording parameter or not (Step S330). If one of the payload accumulation values (that is, the payload accumulation value of any network connection) does not exceed N, content of the network packets is continuously completely recorded. When one of the payload accumulation values exceeds N, the header of each network packet and first M bytes of the payload are recorded for P consecutive network packets of the network connection corresponding to the payload accumulation value exceeding N (Step S340). In other words, when it is found that an accumulated value of the payloads of the network packets recorded for one network connection exceeds N, only the header and the first M bytes of the payload are recorded for the next P network packets of the network connection.

When one of the payload accumulation values exceeds N and after the P consecutive network packets of the network connection corresponding to the payload accumulation value exceeding N are recorded, the header of each network packet is recorded for the network packets of the network connection corresponding to the payload accumulation value (Step S350). In other words, after the P incomplete network packets are recoded in Step S340, only the headers of all the next network packets of the network connection are recorded, but the payloads of the network packets are no longer recorded.

The payloads of the subsequent network packets in the network connection are omitted according to the recording parameter in the recording procedure, thereby greatly reducing a storage space required when the network traffic is recorded. In the recording procedure, the headers of all the network packets and the content of the first part of the payload of the network connection are recorded, such that the content of the recorded network traffic is valuable and is sufficient for analysis or replay in subsequent procedures.

The recording parameter (N, M, P) may be obtained through an experiment method, and different values may be suitable for different network events. More particularly, for different network events, values of N, M, and P are tested and adjusted one by one, so as to obtain the recording parameter through which the most space is saved and the network event is accurately reproduced.

Figure 3A:
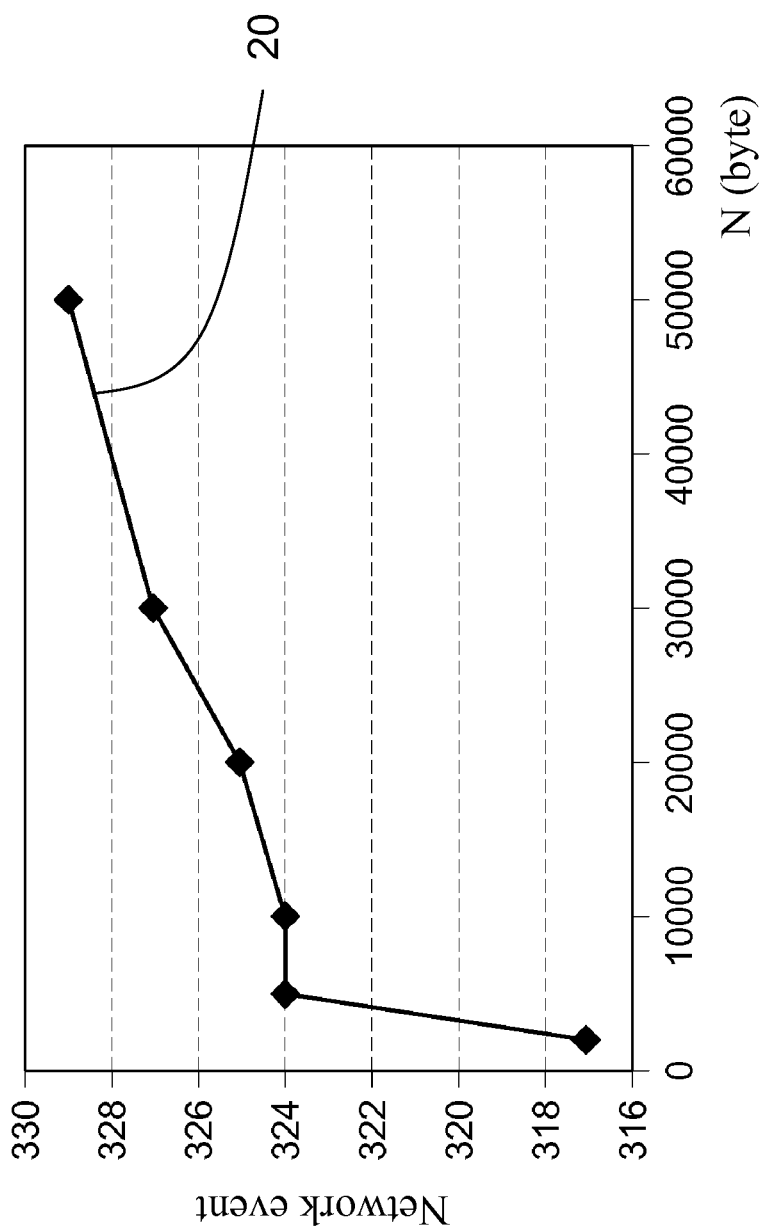
FIG. 3A is a validation diagram of a recording parameter according to an embodiment.
Figure 3B:
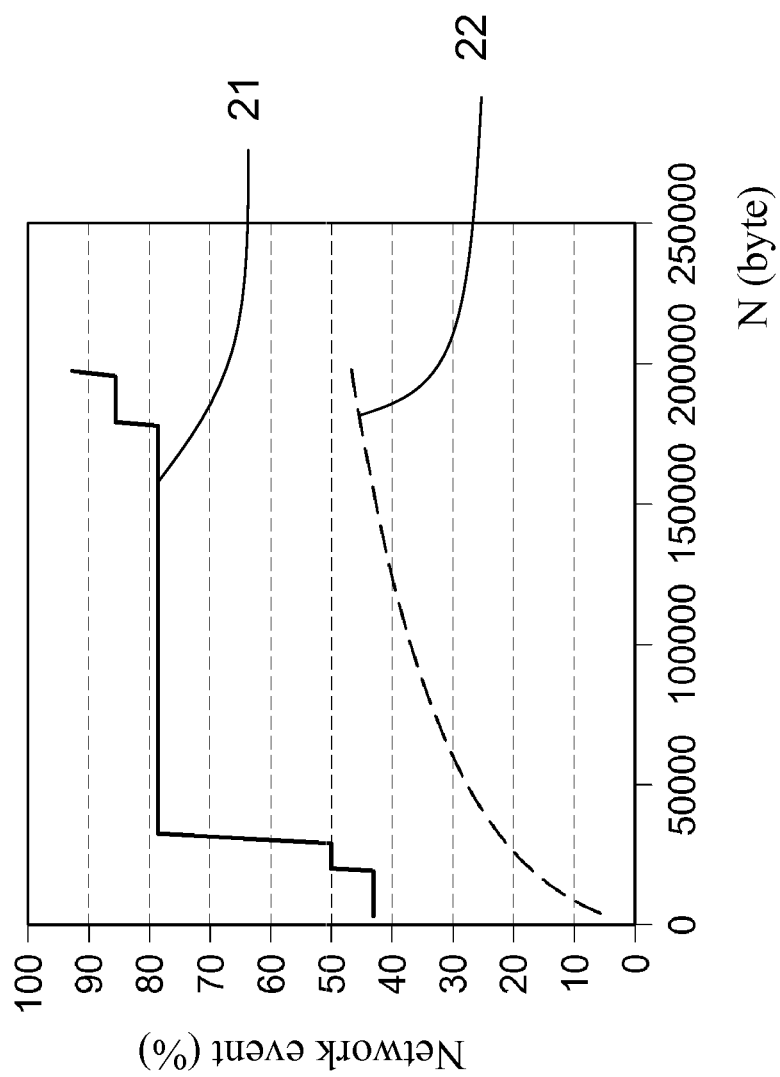
FIG. 3B is a validation diagram of a recording parameter according to an embodiment.

The recording parameter of the attack event is taken as an example. FIGS. 3A and 3B are respectively validation diagrams of the recording parameter according to an embodiment. A network event-N value curve 20, a successfully reproduced network event-N value curve 21, and a consumed storage space-N value curve 22 are shown.

It is assumed that totally 1929 attack events in total are found in all the recorded network traffic, in which the length of the payload of 333 attack events exceeds 2000 bytes. First, the recording parameter of (N, 0, 0) is used for experiment. That is to say, first N bytes of the payload of each network connection in the recorded network traffic are played, so as to test whether the 333 attack events may be reproduced or not through the experiment. An experiment result is as shown in FIG. 3A. When N is 2000, 317 attack events may be reproduced, and the rest 16 attack events which fail to be reproduced are reproduced with a great N value. Therefore, another experiment is performed for obtaining a size of the storage space to be consumed for triggering the 16 attack events, and an experiment result is as shown in FIG. 3B. In order to trigger all the attack events, the great N value must be used, and a large storage space is consumed.

Next, for the four attack events which cannot be reproduced by using the recording parameter (50000, 0, 0), the experiment is performed by using the recording parameter (0, M, ∞), that is, first M bytes of each network packet are replayed. Experiment results are as shown in the following table.

| Description message of attack event | Value of payload (byte) | Maximum value of M |
|---|---|---|
| SHELLCODE x86 setgid 0 | 151611 | 1300 |
| SQL Injection comment attempt | 206085 | 140 |
| Web-CLIENT Windows Media Player zero length bitmap | 390745 | 200 |
| Adobe BMP Image Handler Buffer Overflow | 561305 | 90 |

Figure 3C:
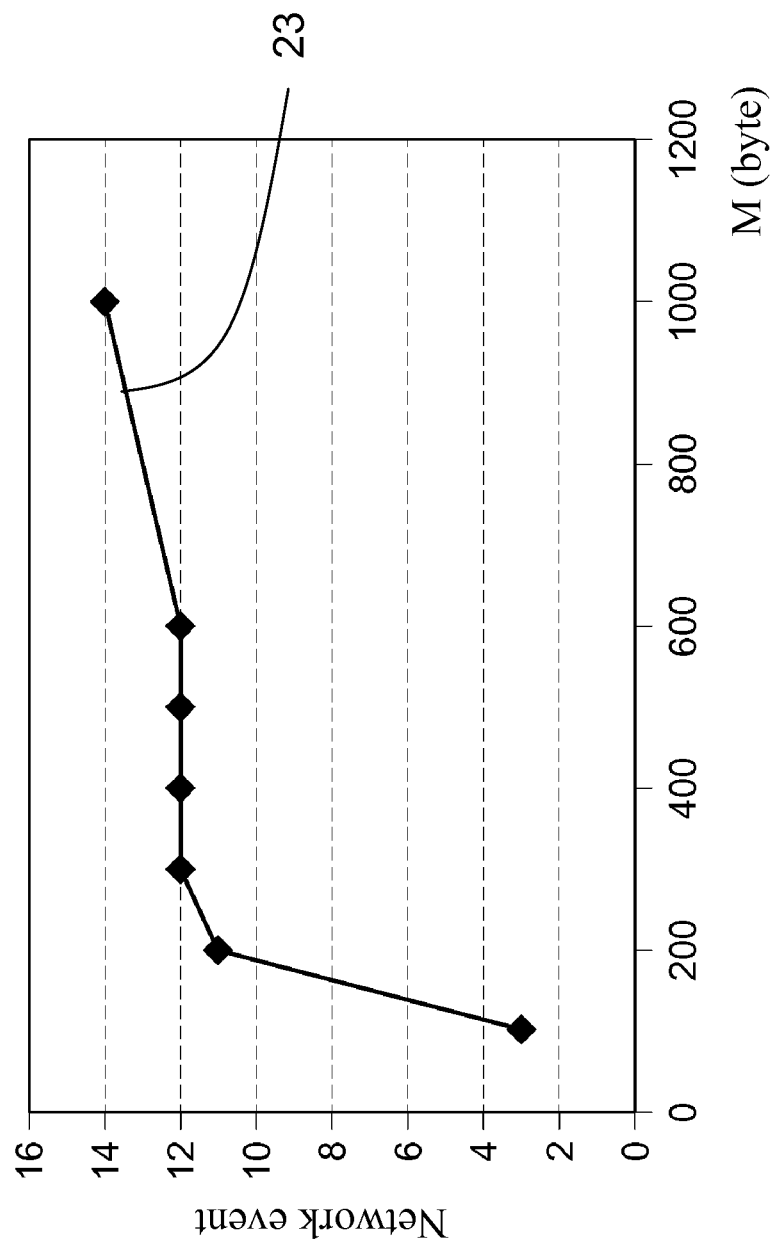
FIG. 3C is a validation diagram of a recording parameter according to an embodiment.

It is known from the table that when M is 200, three attack events may be reproduced. In addition, the 16 attack events which fail to be reproduced through the recording parameter (2000, 0, 0) are tested by using the recording parameter (2000, M, ∞) through the experiment, and a result is as shown in FIG. 3C. It may be known from the network event-M value curve 23 in FIG. 3C that when M is 200 bytes, 11 attack events may be reproduced.

Figure 3D:
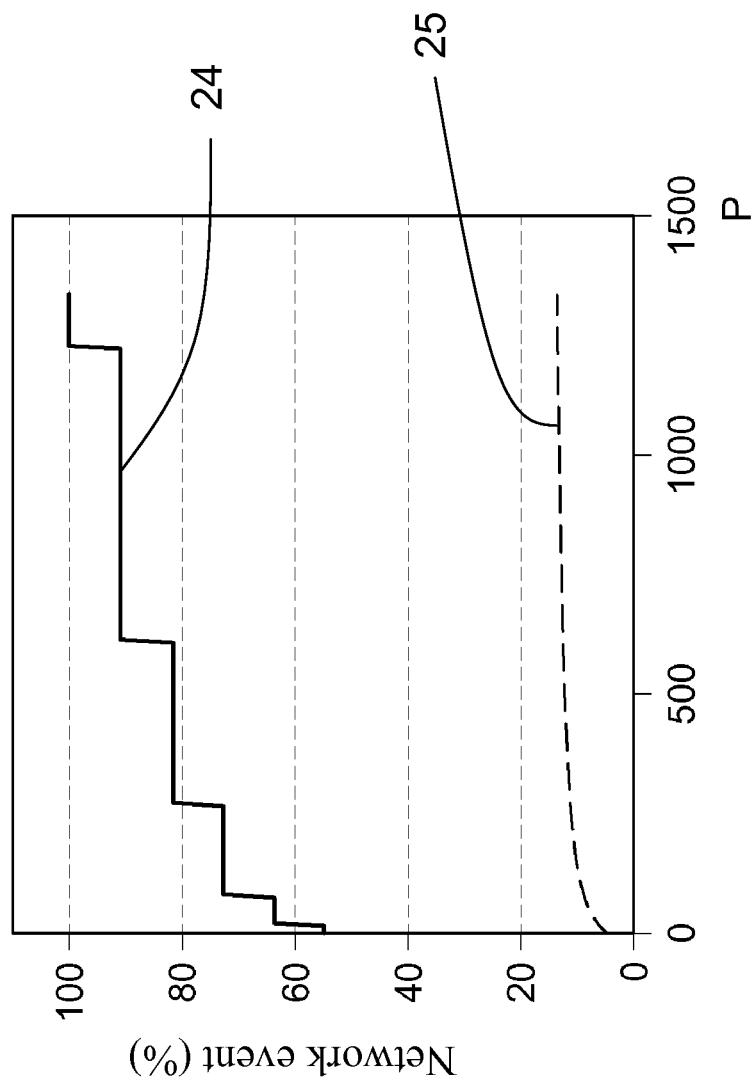
FIG. 3D is a validation diagram of a recording parameter according to an embodiment.

Next, P is adjusted in the experiment, so as to find a relation between the size of the storage space to be consumed and the amount of triggered network events when the network events are replayed by using the recording parameter (2000, 200, ∞). An experiment result is as shown in FIG. 3D, in which a successfully reproduced network event-P value curve 24 and a consumed storage space-P value curve 25 are shown. When P is 1300, 11 attack events can be reproduced. Compared with the conventional method of recording all the network packets, in the present invention, when P is 1300, 87% storage space is saved. When P is 200, 8 attack events may be reproduced, and 90% storage space is saved.

To sum up, for the network event being the attack event, the recording parameter (2000, 200, 1300) may trigger 98.5% network events. Compared with the conventional technology of recording all the packets, in the present invention, 87% storage space is saved. After the experiment is performed by using the similar method, it is known that for the network event being the virus event type, the recording parameter (6000, 0, 0) may trigger 93% network events, and 70% storage space is saved compared with the prior art. Further, for example, for the P2P application, it is suitable to perform recording by mainly using the network packet with the payload comprising UDP data.

Figure 4:
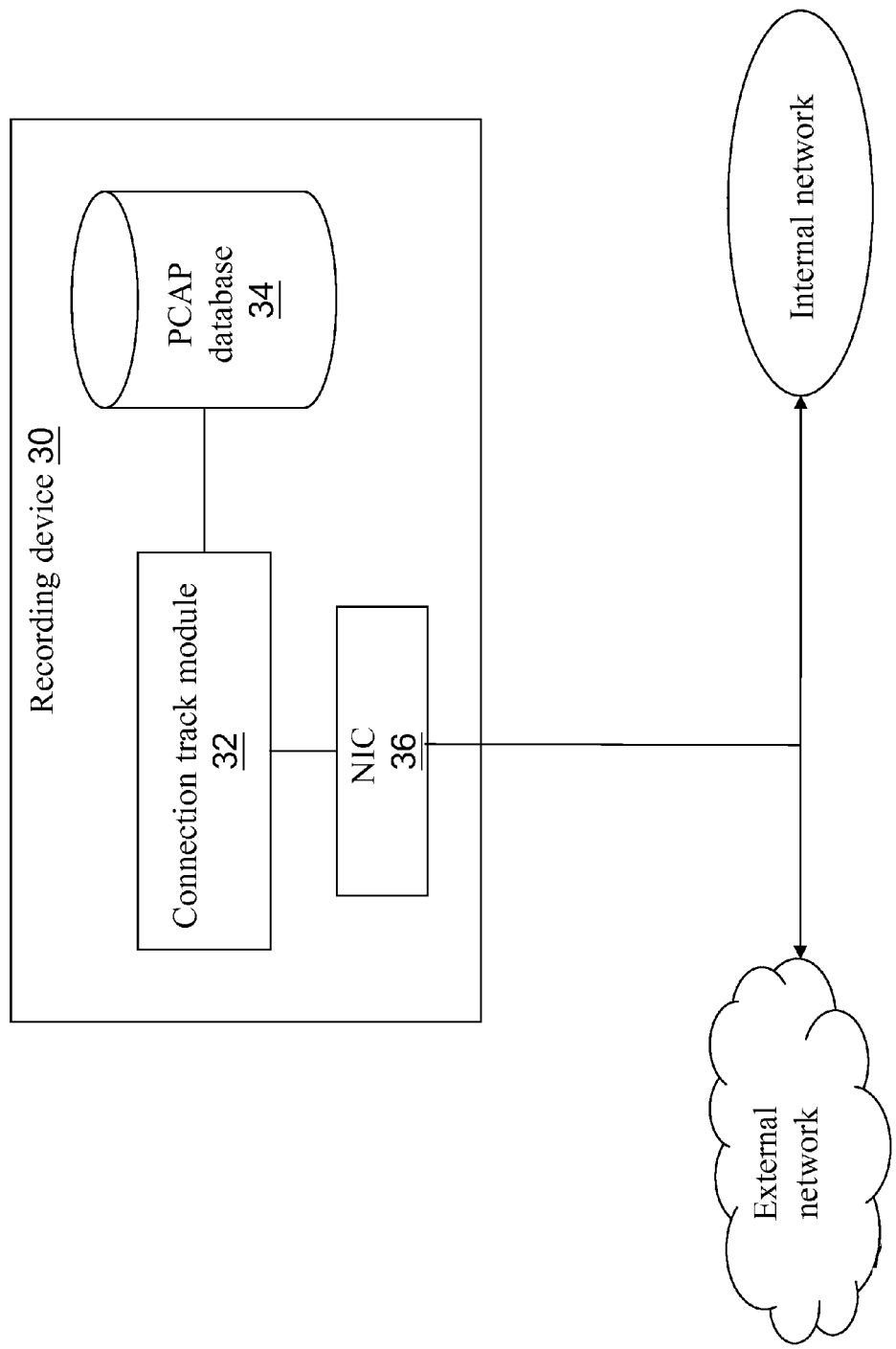
FIG. 4 is a block diagram of a recording device according to an embodiment.

FIG. 4 is a block diagram of a recording device according to an embodiment. The recording procedure may be implemented on a recording device 30, in which the recording device 30 comprises a connection track module 32, a process characterization analysis package (PCAP) database (or referred to as a packet capture database) 34, and a network interface card (NIC) 36.

The recording device 30 may be connected to an external network and an internal network, so as to capture and record network packets of network connections flowing between the external network and the internal network. The connection track module 32 obtains the network packets through the NIC 36, records the network packets as a PCAP file according to the steps of the recording procedure, and stores the PCAP file in the PCAP database 34. Although the PCAP file and the PCAP database 34 are taken as an example in the specification, other databases for logging the network traffic and corresponding file formats may also be used.

Figure 5:
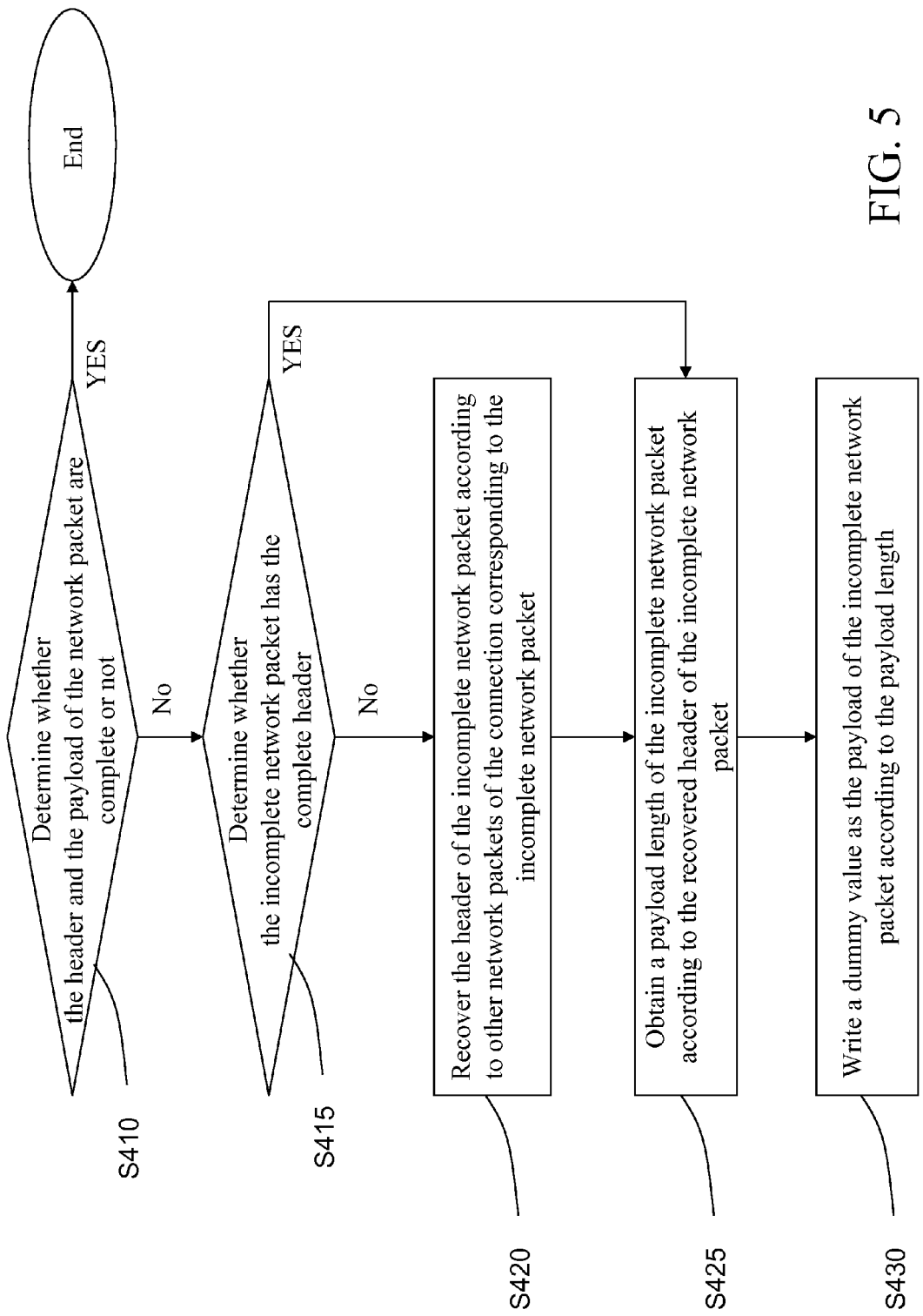
FIG. 5 is a flow chart of a recovery procedure according to an embodiment.

The method for recording, recovering, and replaying the real traffic comprises the recovery procedure. FIG. 5 is a flow chart of the recovery procedure according to an embodiment.

In the recording procedure, data of a part of the network packets may be intentionally omitted for saving the storage space. Therefore, before the network traffic is played (reproduced) according to the network packets, it is necessary to determine whether the recorded network packets are complete or not through the recovery procedure. The complete network packet may be directly forwarded to the selective replay procedure. The incomplete network packet is provided to the selective replay procedure after being processed in the recovery procedure.

In the recovery procedure, first it is determined whether the header and the payload of the current network packet are complete or not through information such as a packet total length field of the header (Step S410). If the network packet is complete, the network packet needs not to be processed. If the network packet is incomplete, it is further determined whether the incomplete network packet has the complete header according to information such as a header length (HLEN) field (Step S415).

When the incomplete network packet has the complete header, a payload length of the incomplete network packet is obtained according to the header of the incomplete network packet (Step S425). In the recovery procedure, a dummy value is written as the payload of the incomplete network packet according to the payload length (Step S430). More particularly, the HLEN is subtracted from the packet total length logged in the header of the incomplete network packet, so as to obtain the payload length. The dummy value as the payload of the network packet may be a random number.

When the incomplete network packet has the incomplete header, first the header of the incomplete network packet needs to be recovered according to other network packets of the network connection corresponding to the incomplete network packet (Step S420). The contents of the headers of the network packets of the same network connection are mostly the same, for example, the headers may have the same source IP address, destination IP address, communication protocol, time to live, or flags; such that the incomplete header may be recovered according to other network packets of the same network connection. The recovery of the two field values HLEN and the total length in the header may be calculated through a relation of "total length=HLEN+payload length". The method for calculating the identification field value is to add 1 to the identification field value every time one network packet is added corresponding to the same source end. Therefore, the identification field value can be calculated through the identification field values of the previous and next network packets having the same source end. Finally, checksum calculation is performed on the network packet being recovered, so as to recover a checksum field value in the header. In this manner, Steps S425 and S430 are executed according to the recovered header, so as to obtain the recovered entire network packet.

In addition, in the recovery procedure, it is detected whether a loss packet is record-lost during the recording or not and the loss packet is recovered. Due to temporarily too high network traffic, the incomplete network packet may also be generated, or even a loss packet being completely record-lost is generated. For the TCP, according to a sequence number and an acknowledgement number of the TCP header obtained after the payload is removed, it can be found whether a network packet is record-lost in the recovery procedure.

Figure 6:
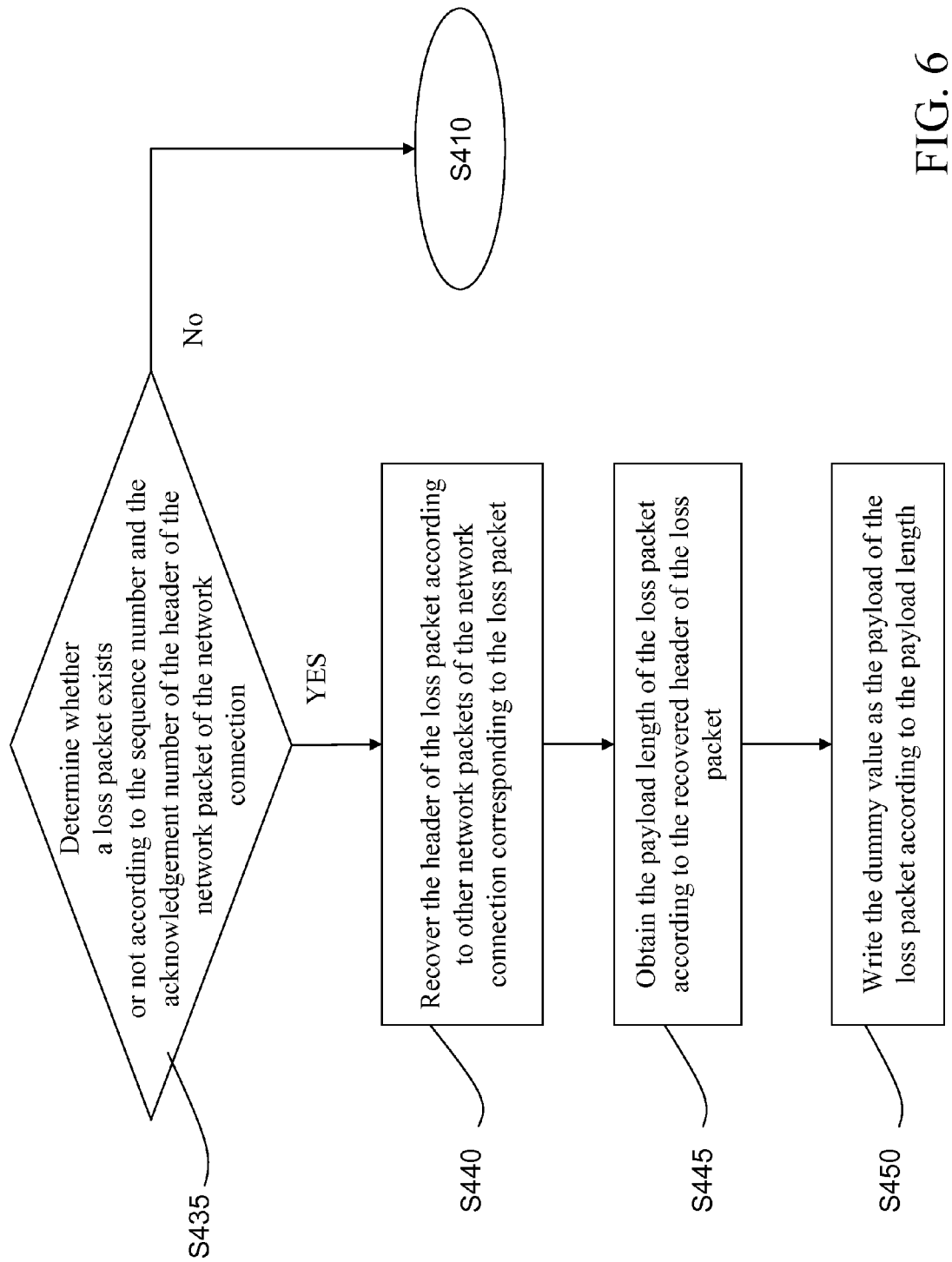
FIG. 6 is a flow chart of a recovery procedure according to another embodiment.

FIG. 6 is a flow chart of the recovery procedure according to another embodiment.

In the recovery procedure, it is first determined whether the loss packet exists or not according to the sequence number and the acknowledgement number of the header of the network packet of the network connection (Step S435). If the loss packet is not found, Step S410 and subsequent steps are executed.

If at least one loss packet is found in the recovery procedure, the loss packet is recovered through the following steps. The header of the loss packet is recovered according to other network packets of the network connection corresponding to the loss packet (Step S440). The payload length of the loss packet is obtained according to the recovered header of the loss packet (Step S445). The dummy value is written as the payload of the loss packet according to the payload length (Step S450).

According to the TCP communication protocol, for a network packet in the same network connection with fixed source IP address and destination IP address, the sequence number of this network packet is the sequence number of the previous network packet plus a data length of the previous network packet. The following table is a table of network packets of the network connection according to an embodiment, the plurality of consecutive network packets in the network connection as well as information such as sequence numbers and acknowledgement numbers thereof are represented in sequence.

|  | Number of network packet | | | | | |
| --- | --- | --- | --- | --- | --- | --- |
|  | 1 | 2 | 3 | 4 | 5 | 6 |
| Source→destination | A→B | A→B | B→A | A→B | A→B | B→A |
| Sequence number | a | a + 10 | b | a + 20 | a + 40 | b |
| Acknowledgement number | b | b | a + 10 | b | b | a + 50 |
| Data length (byte) | 10 | 10 | 0 | 20 | 10 | 0 |

As shown in the table, the sequence number of the network packet 2 may be the sequence number of the network packet 1 plus the data length (10 byte) of the network packet 1.

It is assumed that the network packet 4 is one loss packet, the network packets 1-3 and 5-6 are obtained in the recovery procedure. According to the sequence numbers of the network packets 2 and 5 which are transmitted from A to B, it can be noticed that a network packet with the data length being (a+20)–(a+10), the network packet 4, exists. According to the logic, in the recovery procedure, the loss packet may be found, and the entire loss packet is recovered according to other network packets of the same network connection.

It may be known that in the recovery procedure, the network packets omitted or record-lost when the network traffic is recoded are found according to characteristics of the network protocol, thereby improving accuracy of behaviors of the network traffic.

After the complete network traffic is obtained, in the selective replay procedure, a part of the network traffic is replayed to accurately reproduce the network event. In order to avoid time consumed for replaying all the recoded network packets, in the selective replay procedure, a part of critical network traffic (that is, network packets) sufficient to reproduce the network event is selected through an inverse operation and the network traffic is replayed according to the relevant information of the network event.

Figure 7:
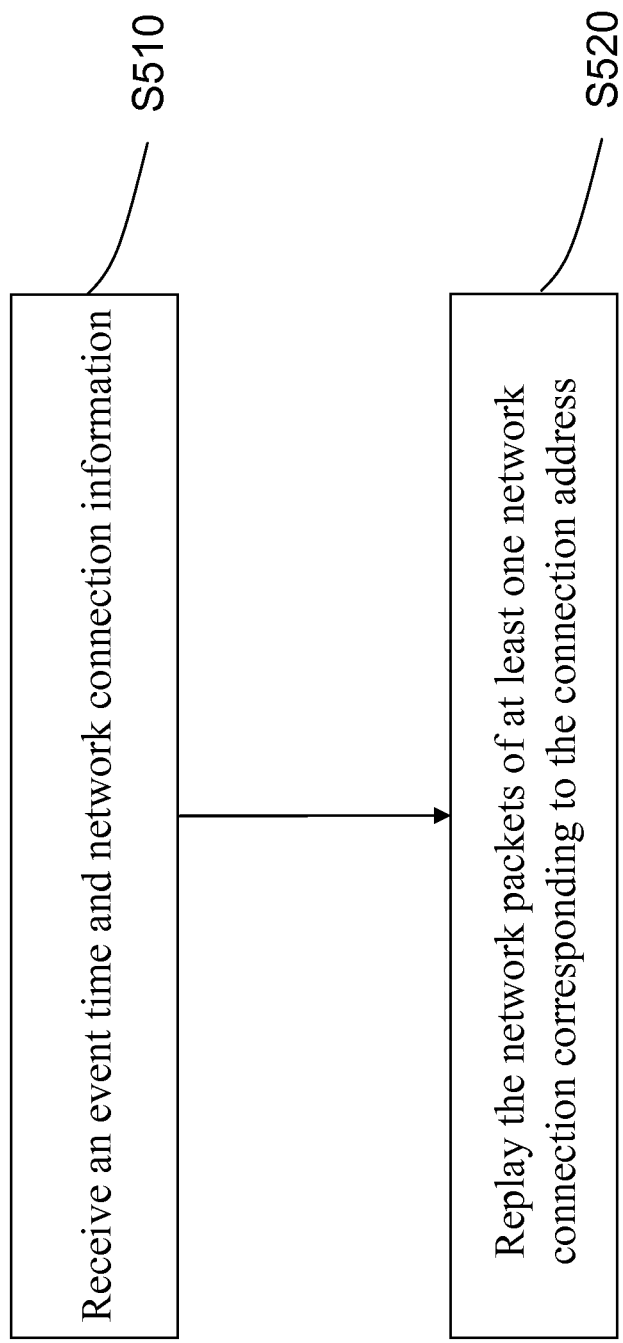
FIG. 7 is a flow chart of a selective replay procedure according to an embodiment.

FIG. 7 is a flow chart of the selective replay procedure according to an embodiment.

In the selective replay procedure, first, an event time and a network connection information of the network event is received (Step S510), in which the network connection information comprises at least one network connection address. Next, according to the network connection address, the network packets of at least one network connection corresponding to the network connection address are replayed (Step S520). The network connection address may be the IP address, and comprises a source IP address and a destination IP address.

More particularly, in the selective replay procedure, the network connections (network packets) having the source IP address and the destination IP address the same as the received network connection address are found from the recorded network connections, and are replayed.

Figure 8:
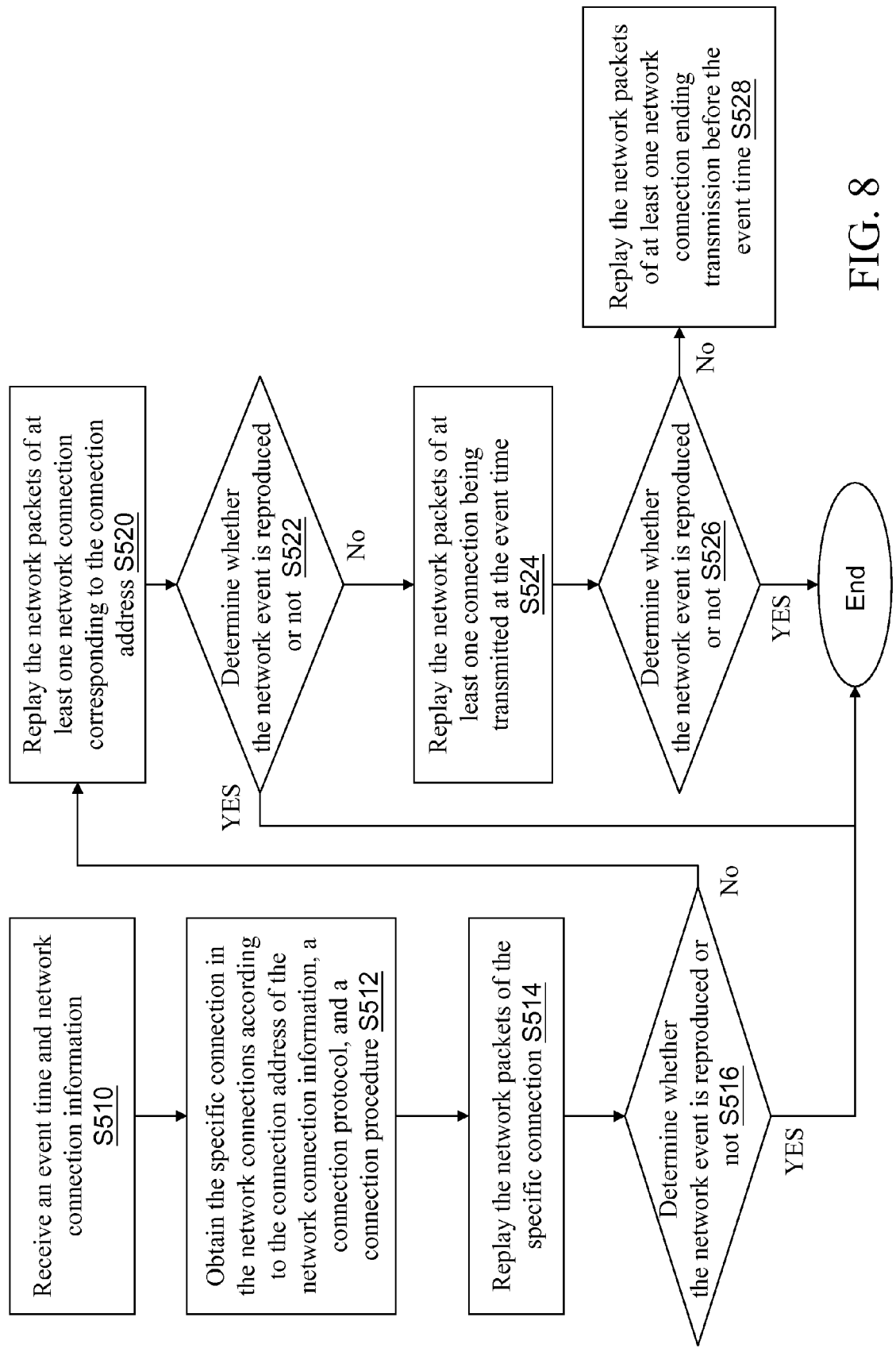
FIG. 8 is a flow chart of a selective replay procedure according to another embodiment.

FIG. 8 is a flow chart of the selective replay procedure according to another embodiment. In this embodiment, in the selective replay procedure, the played network packets are increasingly added until the assigned network event is successfully reproduced.

In addition to the network connection address, the network connection information further comprises a network connection protocol and a network connection port, in which the network connection port comprises a source port and a destination port. According to the five-dimensional information (that is, the source IP address, the destination IP address, the communication protocol, the source port, and the destination port), a specific connection may be assigned.

Therefore, when the network connection information comprises the five-dimensional information, the specific connection in the network connections may be obtained according to the network connection address of the network connection information, the network connection protocol, and the network connection procedure (Step S512); and the network packets of the specific connection are replayed (Step S514) in the selective replay procedure.

In the selective replay procedure, it is determined whether the network event is reproduced or not (Step S516). When the replaying of the packets of the specific connection is not enough to reproduce the network event, or when the network connection information is not enough to assign the specific connection, the network packets of at least one network connection corresponding to the network connection address are replayed according to the network connection address (Step S520). In Step S520, all the network connections corresponding to the network connection address may be replayed, so as to attempt to reproduce the network event.

In Step S522, it is determined again whether the network event is reproduced or not. If not, the network packets of at least one network connection being transmitted at the event time are replayed (Step S524). According to the event time, in the selective replay procedure, all the other network connections being transmitted when the network event occurs are replayed; so as to attempt to reproduce the network event.

Similarly, in Step S526, it is determined again whether the network event is reproduced or not. If not, the network packets of at least one network connection ending transmission before the event time are replayed (Step S528).

In an embodiment according to the present invention, if the network event is not successfully reproduced after Step S528, all the network packets are replayed in the selective replay procedure, so as to reproduce the network event.

Figure 9:
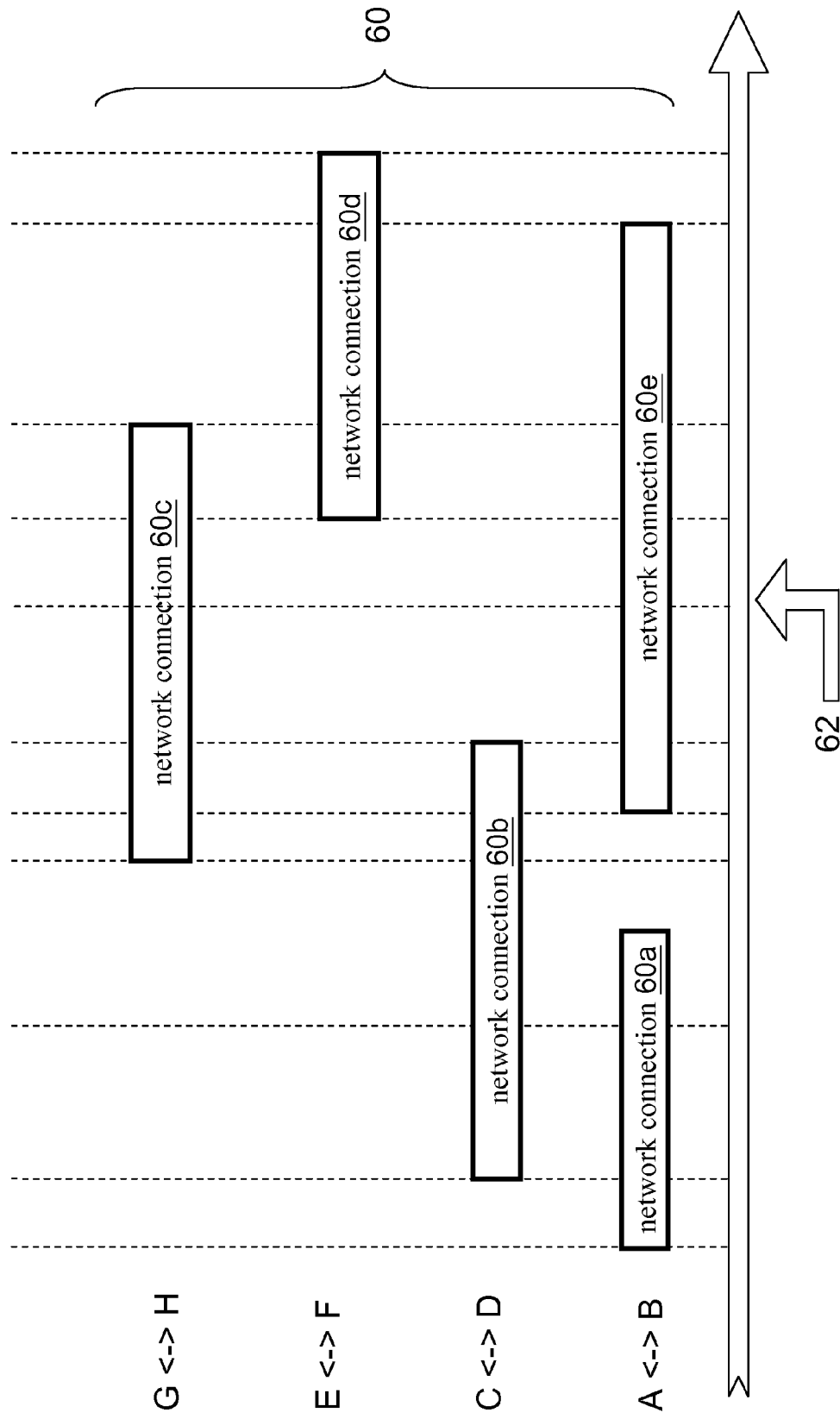
FIG. 9 is a schematic view of selective playing according to an embodiment.

FIG. 9 is a schematic view of selective playing according to an embodiment. According to the event time 62 and the network connection information, in the selective replay procedure, the plurality of network connections 60 is selectively played, so as to reproduce the network event. It is assumed that according to the network connection information, it is obtained that the specific connection is the network connection 60e, and the network connection 60e is the connection between hosts A and B. According to the process in FIG. 8, in the selective replay procedure, the network connections 60 are replayed in a sequence of the network connection 60e, the network connection 60a, the network connection 60c, the network connection 60b, and the network connection 60d.

Figure 10:
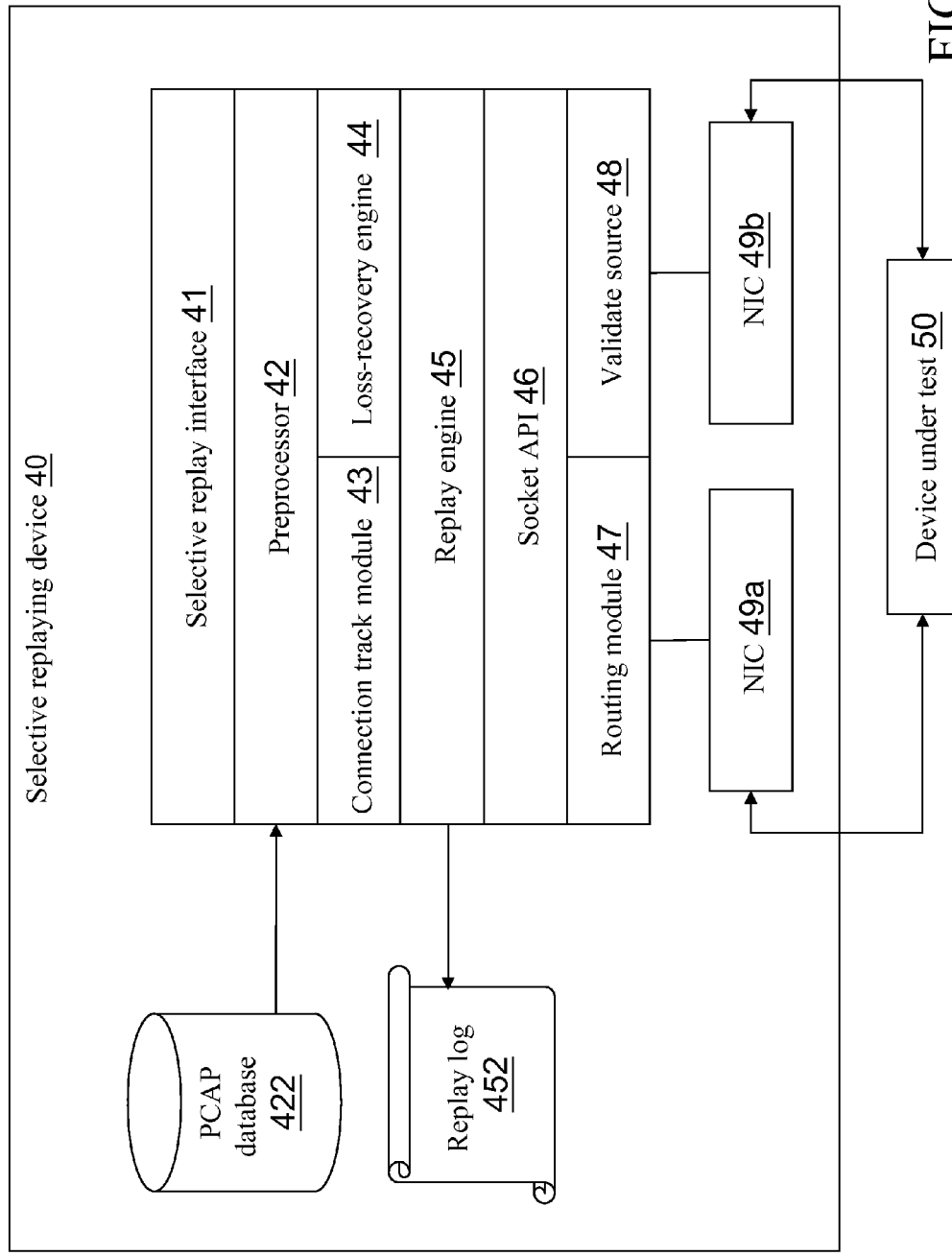
FIG. 10 is a block diagram of a selective replaying device according to an embodiment.

The recovery procedure and the selective replay procedure may be implemented as a selective playing device. FIG. 10 is a block diagram of the selective replaying device according to an embodiment. A selective replaying device 40 comprises a selective replay interface 41, a preprocessor 42, a connection track module 43, a loss-recovery engine 44, a replay engine 45, a socket application program interface (socket API) 46, a routing module 47, a validate source 48, an NIC 49a, an NIC 49b, a PCAP database 422, and a replay log 452. Further, the selective replaying device 40 provides the replayed network packets to a device under test 50 through the NICs 49a and 49b.

The selective replay interface 41 is provided to a user for receiving the event time 62 or network connection information assigned by the user, and transmits the information to the preprocessor 42. The preprocessor 42 obtains the recorded network traffic from the PCAP database 422, and then provides a complete TCP segment or UDP datagram in the network traffic to the connection track module 43. The connection track module 43 logs various states of the network connections 60, and provides a content of a TCP or UDP header obtained through the payload of the current network packet to the loss-recovery engine 44. The loss-recovery engine 44 executes the recovery procedure, and determines whether the current network packet is complete or not, or whether the loss packet exists or not. If necessary, the loss-recovery engine 44 recovers the network packet. The loss-recovery engine 44 confirms a replaying sequence of all the network packets.

In this manner, the replay engine 45 obtains a complete data stream, and transmits the data to be replayed through the socket API 46. The selective replaying device 40 replays the network traffic for the device under test 50 through the routing module 47 and the NIC 49a, and reclaims the network packets sent by the device under test 50 through the NIC 49b and the validate source 48. The network packets returning to the selective replaying device 40 through the device under test 50 are forwarded to the socket API 46 through the validate source 48, so as to determine whether the network packets are modified or not, thereby ensuring the accuracy of the network protocol.

In an embodiment, after confirming that the formerly sent network packets are reclaimed, the replay engine 45 replays the next network packet for the device under test 50. When the network connections 60 are replayed, the start connection time and end connection time of the network connections 60 are logged in the replay log 452.

To sum up, the method for recording, recovering, and replaying the real traffic according to the present invention may comprise the recording procedure, the recovery procedure, and the selective replay procedure. The problems in the prior art such as that the large storage space is wasted, and the network event cannot be accurately reproduced may be solved. In the recording procedure, only the relatively valuable network traffic is recorded according to the recording parameter, thereby saving most of the stage space. In the recovery procedure, the network packets being omitted or record-lost in the recording procedure are recovered to the complete network packets satisfying the network communication protocol. In the selective replay procedure, the network connection technology most relevant to the network event is found, thereby accurately and quickly reproducing the network event, so as to greatly reduce the time for testing the device under test.

What is claimed is:

1. A method for recording and recovering real traffic, used for processing a plurality of network packets of a plurality of network connections, comprising:
   executing a recording procedure, comprising:
   receiving a recording parameter (N, M, P), wherein N, M, and P are integers greater than or equal to one;
   completely recording a header and a payload of each network packet of the plurality of network connections, and accumulating a payload accumulation value of each network connection starting from the first network packet in each network connection and ending at the last network packet in each network connection;
   recording the header of each network packet and first M bytes of the payload of P consecutive network packets of the network connection corresponding to the payload accumulation value when one of the payload accumulation values exceeds N; and
   recording the header of the network packets of the network connection corresponding to the payload accumulation value when one of the payload accumulation values exceeds N and after recording the P consecutive network packets of the network connection corresponding to the payload accumulation value; and
   executing a recovery procedure, comprising:
   determining whether the headers and the payloads of the network packets are complete or not;
   determining whether the incomplete network packet has the complete header or not when obtaining at least one incomplete network packet; and
   executing following steps when the incomplete network packet has the complete header:
   obtaining a payload length of the incomplete network packet according to the header of the incomplete network packet; and
   writing a dummy value as the payload of the incomplete network packet according to the payload length.

2. The method for recording and recovering the real traffic according to claim 1, wherein the recording parameter for an attack event is (2000, 200, 1300).

3. The method for recording and recovering the real traffic according to claim 1, wherein the recording parameter for a virus event is (6000, 0, 0).

4. The method for recording and recovering the real traffic according to claim 1, wherein the network connections satisfy the Transmission Control Protocol (TCP) or the User Datagram Protocol (UDP).

5. The method for recording and recovering the real traffic according to claim 1, wherein the recovery procedure further comprises:
   executing the following steps when the incomplete network packet has the incomplete header:
   recovering the header of the incomplete network packet according to other network packets of the network connection corresponding to the incomplete network packet;
   obtaining the payload length of the incomplete network packet according to the recovered header of the incomplete network packet; and
   writing the dummy value as the payload of the incomplete network packet according to the payload length.

6. The method for recording and recovering the real traffic according to claim 1, wherein the recovery procedure further comprises:
   finding at least one loss packet being record-lost according to a sequence number and an acknowledgement number of the headers of the network connections;
   recovering the header of the loss packet according to other network packets of the network connection corresponding to the loss packet;
   obtaining the payload length of the loss packet according to the recovered header of the loss packet; and
   writing the dummy value as the payload of the loss packet according to the payload length.

7. The method for recording and recovering the real traffic according to claim 1, wherein the dummy value is a random number.

8. A method for recording, recovering, and replaying real traffic, used for processing a plurality of network packets of a plurality of network connections, comprising:
   executing a recording procedure, comprising:
   receiving a recording parameter (N, M, P), wherein N, M, and P are integers greater than or equal to one;
   completely recording a header and a payload of each network packet of the plurality of network connections, and accumulating a payload accumulation value of each network connection starting from the first network packet in each network connection and ending at the last network packet in each network connection;
   recording the header of each network packet and first M bytes of the payload of P consecutive network packets of the network connection corresponding to the payload accumulation value when one of the payload accumulation values exceeds N; and
   recording the header of the network packets of the network connection corresponding to the payload accumulation value when one of the payload accumulation values exceeds N and after recording the P consecutive network packets of the network connection corresponding to the payload accumulation value; and
   executing a recovery procedure, comprising:
   determining whether the headers and the payloads of the network packets are complete or not;
   determining whether the incomplete network packet has the complete header or not when obtaining at least one incomplete network packet; and executing following steps when the incomplete network packet has the complete header:
  obtaining a payload length of the incomplete network packet according to the header of the incomplete network packet; and
  writing a dummy value as the payload of the incomplete network packet according to the payload length; and
executing a replay procedure, comprising:
  receiving an event time and a network connection information, wherein the network connection information comprises at least one network connection address; and
  replaying the network packets of the at least one network connection corresponding to the network connection address.

9. The method for recording, recovering, and replaying the real traffic according to claim 8, wherein the recording parameter for an attack event is (2000, 200, 1300).

10. The method for recording, recovering, and replaying the real traffic according to claim 8, wherein the recording parameter for a virus event is (6000, 0, 0).

11. The method for recording, recovering, and replaying the real traffic according to claim 8, wherein the network connections satisfy the Transmission Control Protocol (TCP) or the User Datagram Protocol (UDP).

12. The method for recording, recovering, and replaying the real traffic according to claim 8, wherein the recovery procedure further comprises:
  executing following steps when the incomplete network packet has the incomplete header:
  recovering the header of the incomplete network packet according to other network packets of the network connection corresponding to the incomplete network packet;
  obtaining the payload length of the incomplete network packet according to the recovered header of the incomplete network packet; and
  writing the dummy value as the payload of the incomplete network packet according to the payload length.

13. The method for recording, recovering, and replaying the real traffic according to claim 8, wherein the recovery procedure further comprises:
  finding at least one loss packet being record-lost according to a sequence number and an acknowledgement number of the headers of the network connections;
  recovering the header of the loss packet according to other network packets of the network connection corresponding to the loss packet;
  obtaining the payload length of the loss packet according to the recovered header of the loss packet; and
  writing the dummy value as the payload of the loss packet according to the payload length.

14. The method for recording, recovering, and replaying the real traffic according to claim 8, wherein the dummy value is a random number.

15. The method for recording, recovering, and replaying the real traffic according to claim 8, wherein the replay procedure further comprises:
  obtaining a specific connection in the network connections according to the network connection address of the network connection information, a network connection protocol, and a network connection port; and
  replaying the network packets of the specific connection.

16. The method for recording, recovering, and replaying the real traffic according to claim 8, wherein the replay procedure further comprises:
  replaying the network packets of the at least one network connection being transmitted at the event time.

17. The method for recording, recovering, and replaying the real traffic according to claim 8, wherein the replay procedure further comprises:
  replaying the network packets of the at least one network connection ending transmission before the event time.

18. The method for recording, recovering, and replaying the real traffic according to claim 8, wherein the network connection address is the Internet Protocol (IP) address.

* * * * *